United States Patent
Seo

(10) Patent No.: US 12,087,520 B2
(45) Date of Patent: Sep. 10, 2024

(54) WIRE DISTRIBUTOR-COMBINED TUMBLER SWITCH DEVICE

(71) Applicant: SANG GEON CO., LTD., Wonju-si (KR)

(72) Inventor: SangJin Seo, Wonju-si (KR)

(73) Assignee: SANG GEON CO., LTD., Wonju-si (KR)

( * ) Notice: Subject to any disclaimer, the term of this patent is extended or adjusted under 35 U.S.C. 154(b) by 148 days.

(21) Appl. No.: 17/910,068

(22) PCT Filed: Dec. 3, 2020

(86) PCT No.: PCT/KR2020/017550
§ 371 (c)(1),
(2) Date: Sep. 8, 2022

(87) PCT Pub. No.: WO2021/194045
PCT Pub. Date: Sep. 30, 2021

(65) Prior Publication Data
US 2023/0097409 A1  Mar. 30, 2023

(30) Foreign Application Priority Data

Mar. 24, 2020 (KR) .......... 20-2020-0001003
Oct. 28, 2020 (KR) .......... 10-2020-0140804

(51) Int. Cl.
*H01H 23/14* (2006.01)
*H01H 23/16* (2006.01)

(52) U.S. Cl.
CPC ........... *H01H 23/14* (2013.01); *H01H 23/16* (2013.01)

(58) Field of Classification Search
CPC .... H01H 23/143; H01H 23/30; H01H 23/025; H01H 2300/03; H01H 23/145; H01H 2221/016; H01H 23/14; H01H 23/04; H01H 23/168; H01H 2221/018; H01H 23/02; H01H 23/12; H01H 23/003; H01H 23/146; H01H 23/16; H01H 23/20; H01H 23/28; H01H 23/00; H01H 23/148; H01H 23/24; H01H 23/26
See application file for complete search history.

(56) References Cited

U.S. PATENT DOCUMENTS

2013/0109219 A1* 5/2013 Liao .................... H01R 13/743
439/535

FOREIGN PATENT DOCUMENTS

| JP | H07111717 A | 4/1995 |
|---|---|---|
| JP | 2005216548 A | 8/2005 |
| KR | 200364974 Y1 | 10/2004 |
| KR | 101810213 B1 | 12/2017 |
| KR | 1020180019034 A | 2/2018 |
| KR | 200492584 Y1 | 11/2020 |

* cited by examiner

*Primary Examiner* — Ahmed M Saeed
(74) *Attorney, Agent, or Firm* — You & IP, LLC

(57) ABSTRACT

The present disclosure provides a wire distributor-combined tumbler switch device including a bracket assembly which is fixed to a switch housing bracket installed on a wall surface of a building, a switching-wire distributor module which is coupled to the bracket assembly, is electrically connected to an electric wire of an electric device, regulates power on/off, and is configured to distribute electric wires of a distributing board, and a detachable coupling means configured to detachably couple the switching-wire distributor module to the bracket assembly.

12 Claims, 20 Drawing Sheets

400:410, 420, 430, 440, 450

WIRE DISTRIBUTOR-COMBINED TUMBLER SWITCH DEVICE

TECHNICAL FIELD

The present disclosure relates to a wire distributor-combined tumbler switch device and, and more particularly, to a wire distributor-combined tumbler switch device which is configured so that a wire is distributed on the side of the tumbler switch device installed at a certain height of a vertical wall of a building, enabling easy electric wire entry and distributing connection work to improve work efficiency, eliminate the need for equipment such as ladders for electrical wiring work on the ceiling of a building, and preventing safety accidents of workers due to electrical wiring work on the ceiling from occurring.

BACKGROUND ART

In general, switches installed on a wall or the like to connect power to at an indoor home or office are mostly in a form in which a switch cover is fastened to give an aesthetic feeling to the interior of the home or office while protecting the internal connection parts and wires.

Conventionally, a tumbler switch installed on a wall and manually operated is widely used as a switch for controlling on/off of lighting equipment installed in a room.

A tumbler switch is a type of switch that is widely used as an indoor/outdoor lighting switch in homes or offices and has a structure such that a supply of power to the lighting equipment is activated and deactivated by the manipulation of the switch to control the turning on/off of the lighting equipment.

The tumbler switch includes a housing installed inside a wall, a bracket installed on the front side of the housing, a switch cover that closes the front side of the bracket, a switch assembly assembled using the bracket, a knob assembly assembled with the switch assembly, and the like.

In addition, the knob assembly includes a knob body that is assembled on the switch assembly side in a pivot structure to perform a power on/off control function, a knob cover that is coupled to the front side of the knob body to perform an on/off identification function, and the like.

However, the conventional tumbler switch has a problem in that the tumbler switch merely executes the on/off function of the switch assembly according to the manipulation of the knob and does not provide any other functions at all.

On the other hand, in general, for electric light and electric heating wiring inside a building, a steel pipe or PVC pipe is buried in cement from a distribution board on each floor, an outlet box is installed at each light location, and then a flexible tube is extended to a light fixture or an outlet.

FIG. 1 is a cross-sectional view illustrating a wired state by a conventional wiring work, in which a wiring pipe 20 is installed inside a ceiling cement layer 10 of a building so that a wire is inserted into the wiring pipe 20, an outlet box 16 is installed at the position of a light fixture 32, and a flexible tube 36 having a connector 34 at one end is extended from the outlet box 16 to the light fixture 32 such that the connector 34 is connected to the light fixture 32.

However, the wiring method as described above has a problem in that since the wiring pipe connected to each light fixture 32 via an electric outlet is buried in the cement layer 10, if the wiring work is re-performed according to the change in the use and structure of a building, the cost of renovation/repair of the building increases, and it is inconvenient to perform wire entry work and distributing connection work.

In particular, when performing the wire entry work and the distributing connection work on the ceiling, a problem arises in that a ladder, or the like needs to be used, so that inconvenience of requiring working equipment such as ladders or the like, may be caused, and safety accidents for workers, such as falls, may occur.

In other words, according to the conventional electrical wiring construction method, since a connection point is formed in a joint box of the ceiling, the electrical wiring construction technician needs to climb an A-shaped ladder and connect a power line and an electric light line in the joint box, so there is inconvenience in the wiring construction should be performed by the technicians in pairs.

Further, even in the case of maintenance due to poor connection or short circuit, it is inconvenient to remove the gypsum board around the central portion of the indoor ceiling installed under the concrete.

In addition, conventionally, since the power line drawn out from the distribution box has to be arranged along the central portion of the indoor ceiling for each compartment, there is a problem in that the material of the power line is wasted unnecessarily.

DISCLOSURE

Technical Problem

Therefore, in order to solve the above-mentioned conventional problems, various embodiments of the present disclosure are directed to a wire distributor-combined tumbler switch device which is configured so that a wire is distributed on the side of the tumbler switch device installed at a certain height of a vertical wall of a building, enabling easy electric wire entry and distributing connection works to improve work efficiency, and simplifying necessary equipment to improve worker mobility and work environment.

In addition, various embodiments are directed to a wire distributor-combined tumbler switch device, which may eliminate the need for equipment such as ladders for electrical wiring work on the ceiling of a building to prevent safety accidents of workers due to electrical wiring work on the ceiling from occurring, and to arrange a power line drawn out from a distribution box along the indoor floor bottom for each compartment.

The problems of the present disclosure to be solved are not limited to those mentioned above, and other problems not mentioned will be clearly understood by those skilled in the art from the following description.

Technical Solution

In a first embodiment of the present disclosure, a wire distributor-integrated tumbler switch device may include: a bracket assembly fixed to a switch housing bracket installed on a wall surface of a building; a switching-wire distributor module coupled to the bracket assembly and configured to allow an electric wire of an electric device to be electrically connected thereto, to regulate power on/off, and to distribute electric wires of a distributing board; and a detachable coupling means configured to detachably couple the switching-wire distributor module to the bracket assembly.

Preferably, the bracket assembly may include: a coupling bracket having an opening through which a switching knob is exposed; and a closing cover coupled to a front surface of the coupling bracket and having an opening through which the switching knob is exposed, and the switching-wire distributor module may include: a module housing coupled to the bracket assembly; a first partition wall dividing the module housing into a plurality of division spaces; one or more switching assemblies provided in a space on one side of the module housing divided by the first partition wall such that an electric wire of an electric device is electrically connected thereto to control power on/off; and one or more wire distributor assembly provided in a space on the other side of the module housing divided by the first partition wall to distribute electric wires of a wire distributing board.

Preferably, the switching assembly may include: a wire connection hole formed in an upper surface of the module housing; a fixed contact to which an electric wire inserted through the wire connection hole is connected; a movable contact provided on an upper portion of the fixed contact to energize and short the fixed contact according to a see-saw motion thereof; and a switching knob rotatably mounted on the movable contact to see-saw the movable contact during rotation, wherein the wire distributor assembly may include: a second partition wall dividing the space divided by the first partition wall into a plurality of sub-spaces; a plurality of wire entry holes formed on the upper surface of the module housing in the sub-space divided by the second partition wall; an electrical connection plate electrically connected to the electric wire introduced into the wire entry hole; and an elastic support provided in the module housing to elastically support the electric wire introduced into the wire entry hole toward the electrical connection plate.

Preferably, the electrical connection plate may include: a plurality of connection plate parts formed along downward extension lines of the wire entry holes; and a common plate part integrally formed at lower ends of the connection plate parts, wherein the elastic support is formed in an inverted "S" shape in which a lower end thereof is fixed to the common plate part, and an upper end thereof extends obliquely so that the extended end is provided in elastic contact with the connection plate part of the electrical connection plate to allow the introduced wire to come into elastic contact toward the electrical connection plate, wherein the wire distributor assembly may further include a push operator in which an upper portion thereof is partially exposed toward the upper surface of the module housing so as not to fall off toward the upper surface of the module housing, and a lower portion thereof is in contact with the upper end of the elastic support so that the upper end is pressed.

Preferably, the detachable coupling means may include: a pair of protruding flanges formed on both sides of a rear surface of the coupling bracket; a plurality of locking hooks protruding from opposite surfaces of the pair of protruding flanges; and a pair of locking steps protruding from both sides of the module housing to be fixedly hooked by the locking hooks.

Preferably, the detachable coupling means may further include a guide fixing means configured to guide the mounting operation of the module housing and fix the module housing in a direction orthogonal to the mounting direction.

Preferably, the guide fixing means may include: a guide groove formed in a central portion of the locking hook; and a guide protrusion formed in a direction orthogonal to the locking step at a central portion of the locking step so as to be guided along the guide groove when mounted, wherein the guide protrusion is formed to have a length such that the guide protrusion is in a state of being inserted into the guide groove when the locking step is fixedly hooked by the locking hook.

Preferably, the detachable coupling means may include: a pair of guide rails respectively formed on both sides of the rear surface of the coupling bracket; a plurality of mounting grooves formed at regular intervals on a bottom surface of the guide rail; a plurality of seating grooves formed in a sidewall of the guide rail at a predetermined interval; a plurality of mounting protrusions formed to protrude from both sides of a lower surface of the module housing so as to be fixedly inserted into the mounting grooves; and a plurality of seating protrusions formed to protrude from both sides of the module housing so as to be seated and coupled to the seating grooves.

In a second embodiment of the present disclosure, a wire distributor-combined tumbler switch device may include: a bracket assembly fixed to a switch housing bracket installed on a wall surface of a building; at least one switching assembly coupled to the bracket assembly and configured to allow an electric wire of an electric device to be electrically connected thereto and regulate power on/off; at least one wire distributor assembly coupled to the bracket assembly and configured to distribute electric wires of a distributing board; and a detachable coupling means configured to detachably couple the switching assembly and the wire distributor assembly to the bracket assembly.

Advantageous Effects

The wire distributor-integrated tumbler switch device according to the present disclosure has the following effects.

First, the present disclosure has the effect of improving the work efficiency by enabling the electrical entry and distributing connection work at a certain height of the vertical wall of a building.

Second, the present disclosure has the effect of improving the worker's mobility and work environment by simplifying the necessary equipment used for the electrical wiring work.

Third, the present disclosure has the effect of preventing safety accidents such as falls because electrical wiring work in the ceiling of a building is not required.

Fourth, the present disclosure has the effects of improving the convenience of electrical wiring construction and saving the electrical wiring material by arranging the power lines drawn out from the distribution box along the indoor floor for each division and along the indoor sidewall.

The effects of the present disclosure are not limited to those mentioned above, and other solutions not mentioned will be clearly understood by those skilled in the art from the following description.

MODE FOR DISCLOSURE

Figure 1:
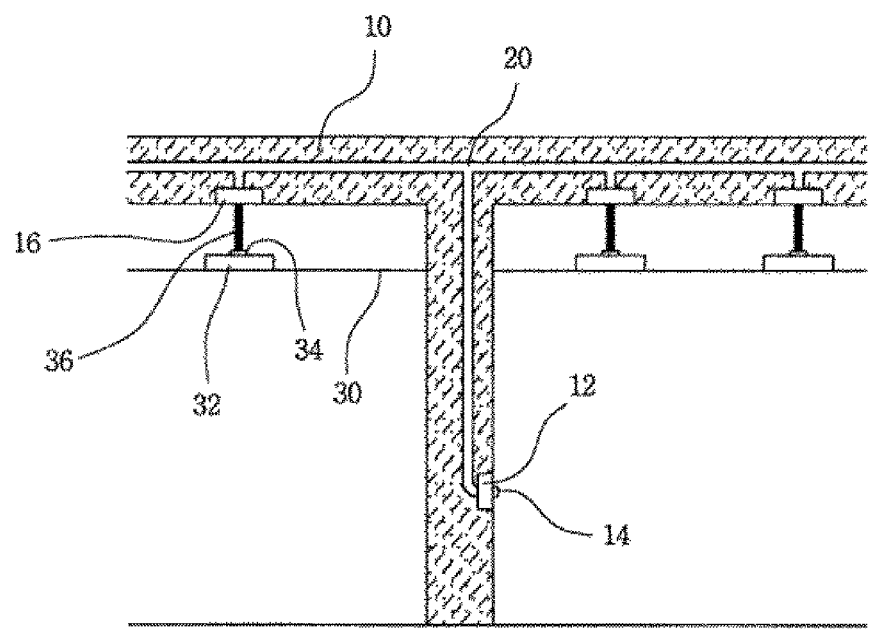
FIG. 1 is a cross-sectional view illustrating a wired state by a conventional wiring work.

Additional objectives, features and advantages of the present disclosure may be more clearly understood from the following detailed description and accompanying drawings.

Prior to describing the present disclosure in detail, the present disclosure can make various changes and can have various embodiments, so it should be understood that examples described below and illustrated in the drawings are not intended to limit the present disclosure to specific embodiments, but include all modifications, equivalents, and substitutes included in the spirit and scope of the present disclosure.

In addition, in the description with reference to the accompanying drawings, like components are denoted as like reference numerals, and a redundant description thereof will be omitted. In describing the present disclosure, if it is determined that a detailed description of a related known technology may unnecessarily obscure the gist of the present disclosure, the detailed description will be omitted.

Hereinafter, a wire distributor-combined tumbler switch device according to a preferred embodiment of the present disclosure will be described in detail with reference to the accompanying drawings.

Figure 2:
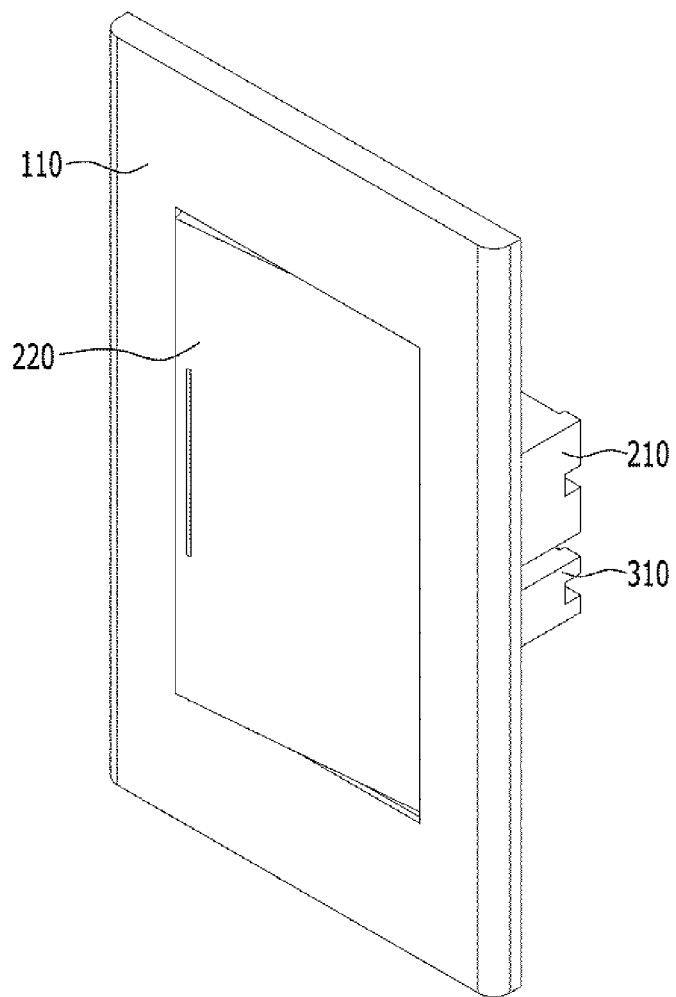
FIG. 2 is a perspective view illustrating a wire distributor-combined tumbler switch device according to an embodiment of the present disclosure, as viewed from the front side.
Figure 3:
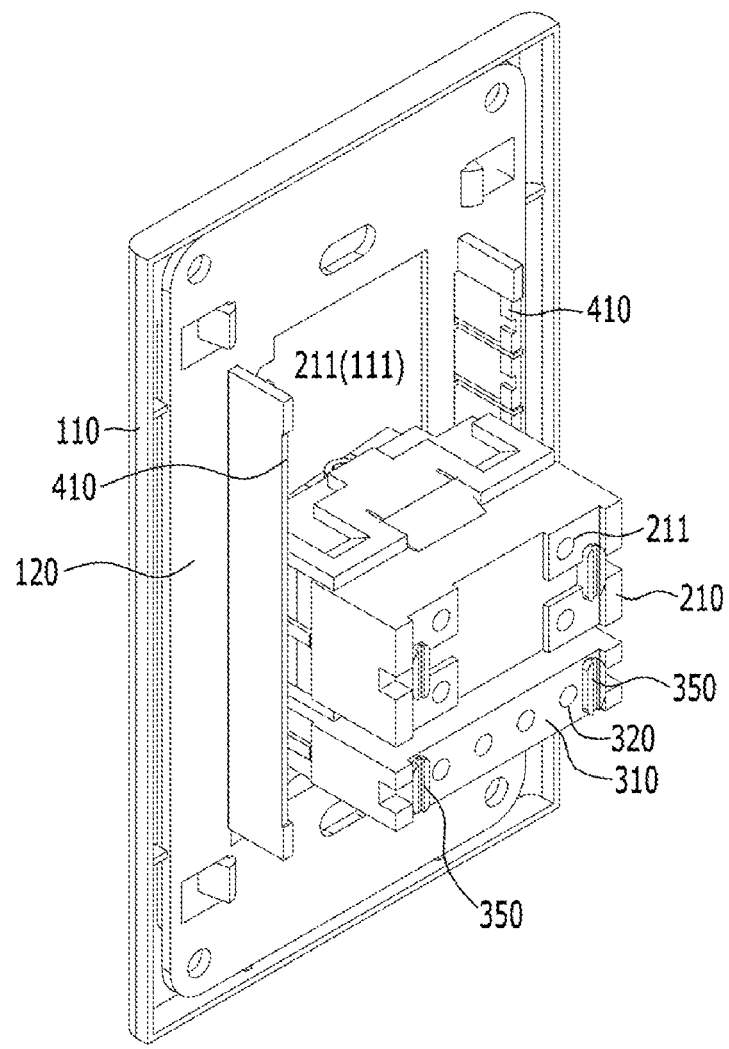
FIG. 3 is a perspective view illustrating the wire distributor-combined tumbler switch device according to the embodiment of the present disclosure, as viewed from the rear side.
Figure 4:
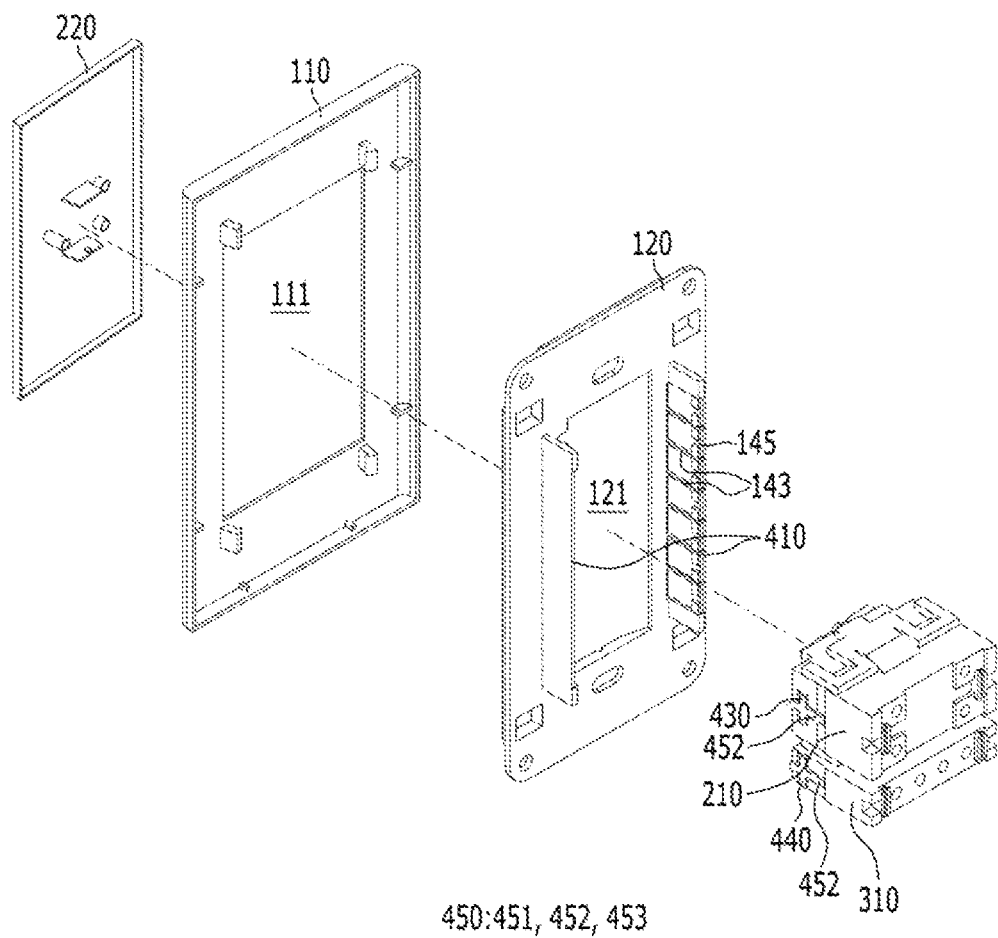
FIG. 4 is an exploded perspective view illustrating the wire distributor-combined tumbler switch device according to the embodiment of the present disclosure, as viewed from the rear side.
Figure 5:
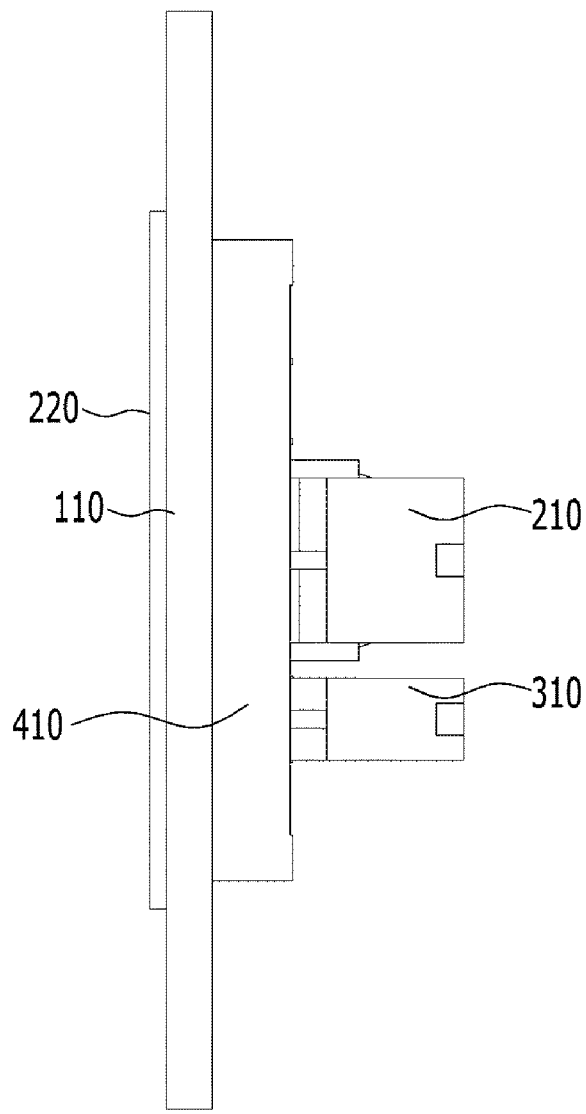
FIG. 5 is a side view illustrating the wire distributor-combined tumbler switch device according to the embodiment of the present disclosure.
Figure 6:
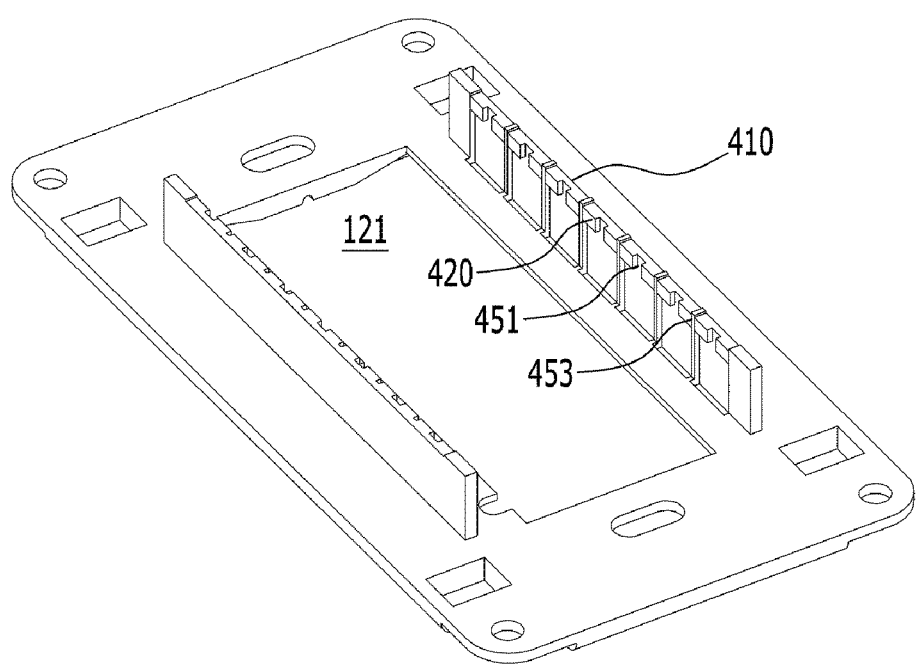
FIG. 6 is a perspective view illustrating a mounting bracket member constituting the wire distributor-combined tumbler switch device according to the embodiment of the present disclosure, as viewed from the rear side.
Figure 7:
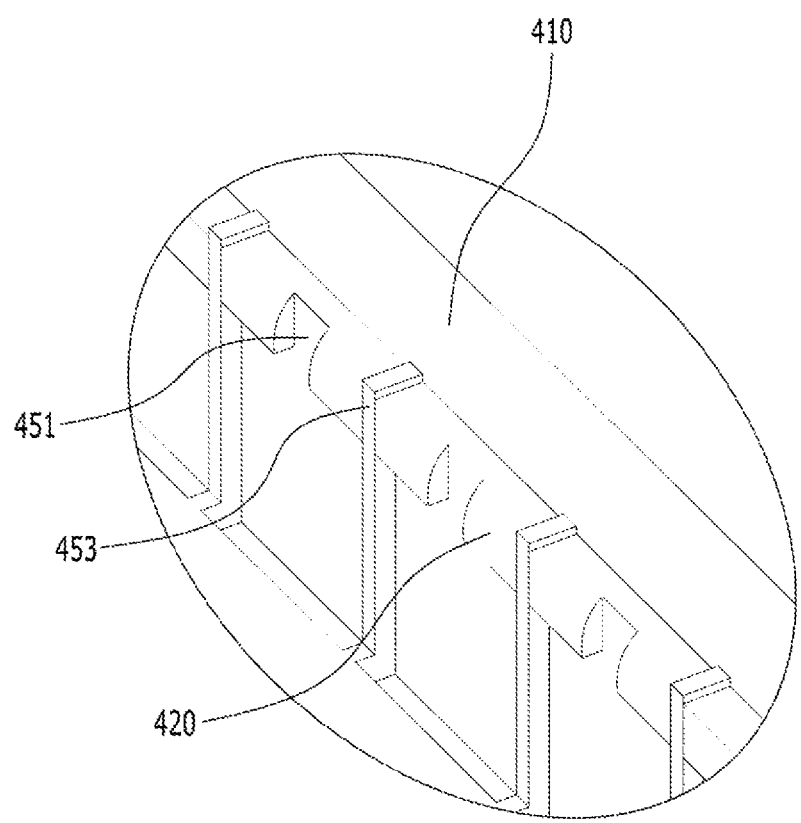
FIG. 7 is a partially enlarged view illustrating the mounting bracket member constituting the wire distributor-combined tumbler switch device according to the embodiment of the present disclosure.
Figure 8:
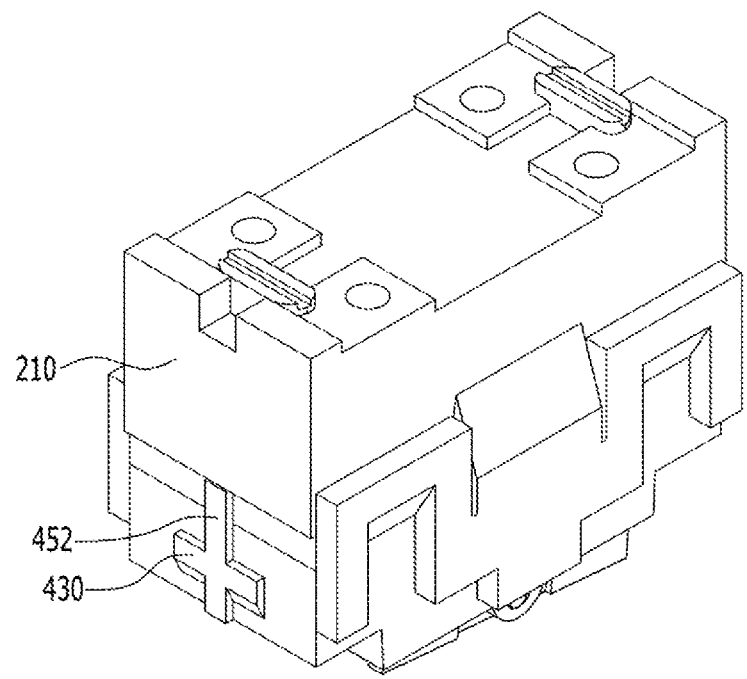
FIG. 8 is a perspective view illustrating a switching assembly constituting the wire distributor-combined tumbler switch device according to the embodiment of the present disclosure.
Figure 9:
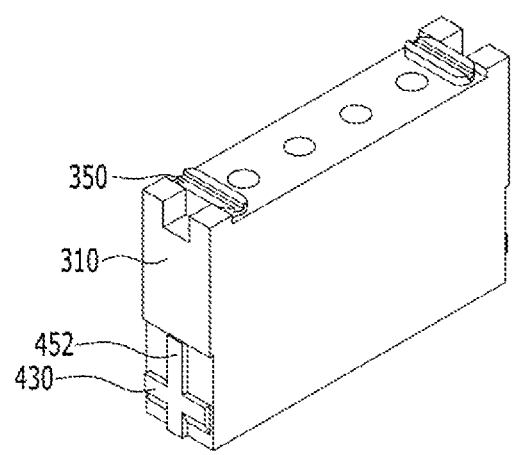
FIG. 9 is a perspective view illustrating a wire distributor assembly constituting the wire distributor-combined tumbler switch device according to the embodiment of the present disclosure.
Figure 10:
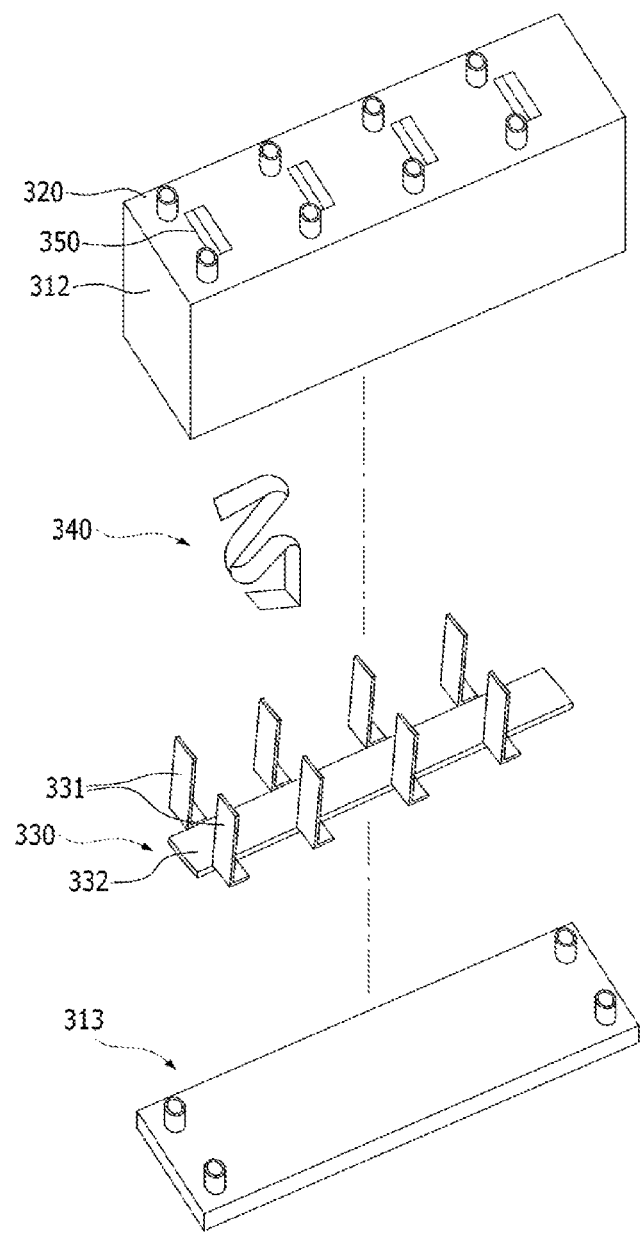
FIG. 10 is an exploded perspective view illustrating a wire distributor assembly constituting the wire distributor-combined tumbler switch device according to the embodiment of the present disclosure.
Figure 11:
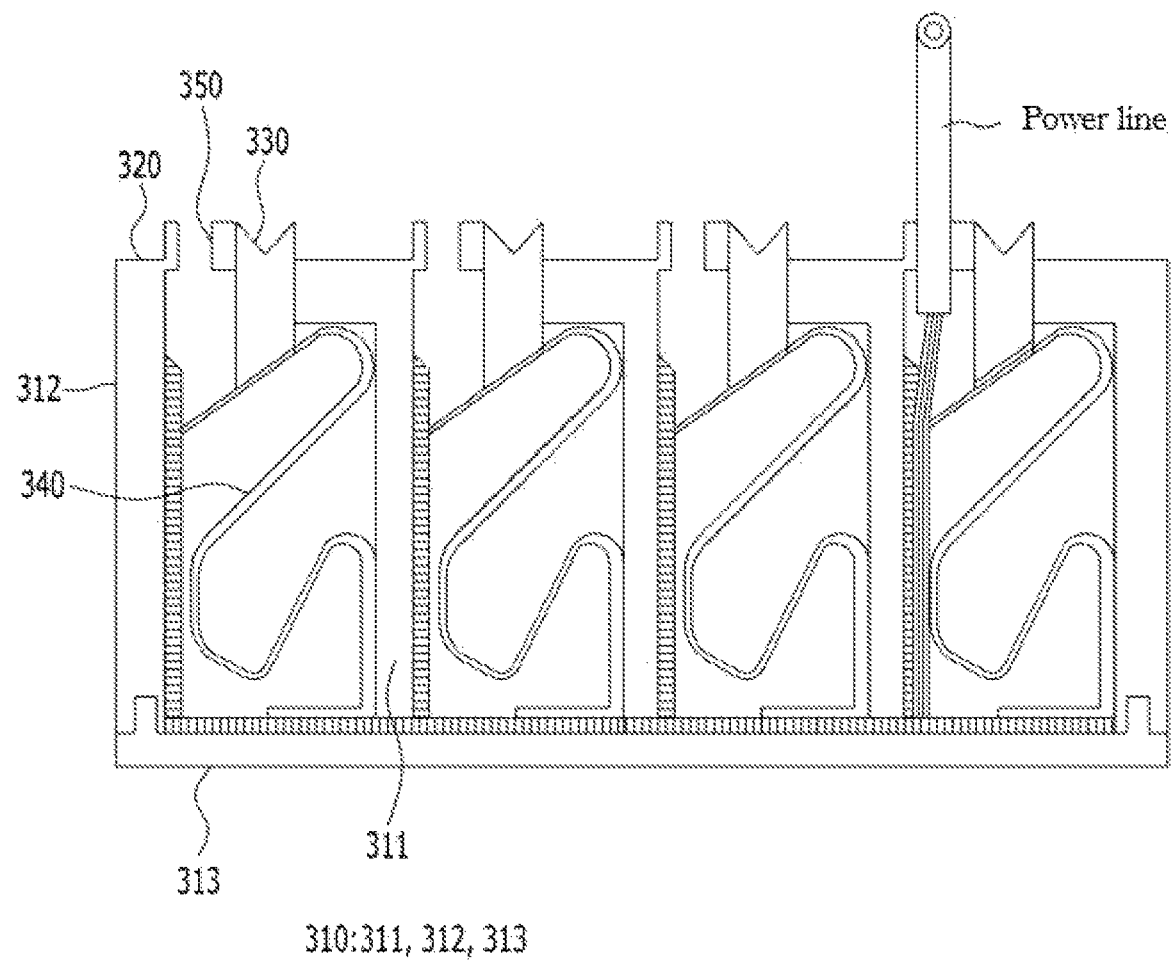
FIG. 11 is a cross-sectional view illustrating the wire distributor assembly constituting the wire distributor-combined tumbler switch device according to the embodiment of the present disclosure.
Figure 12:
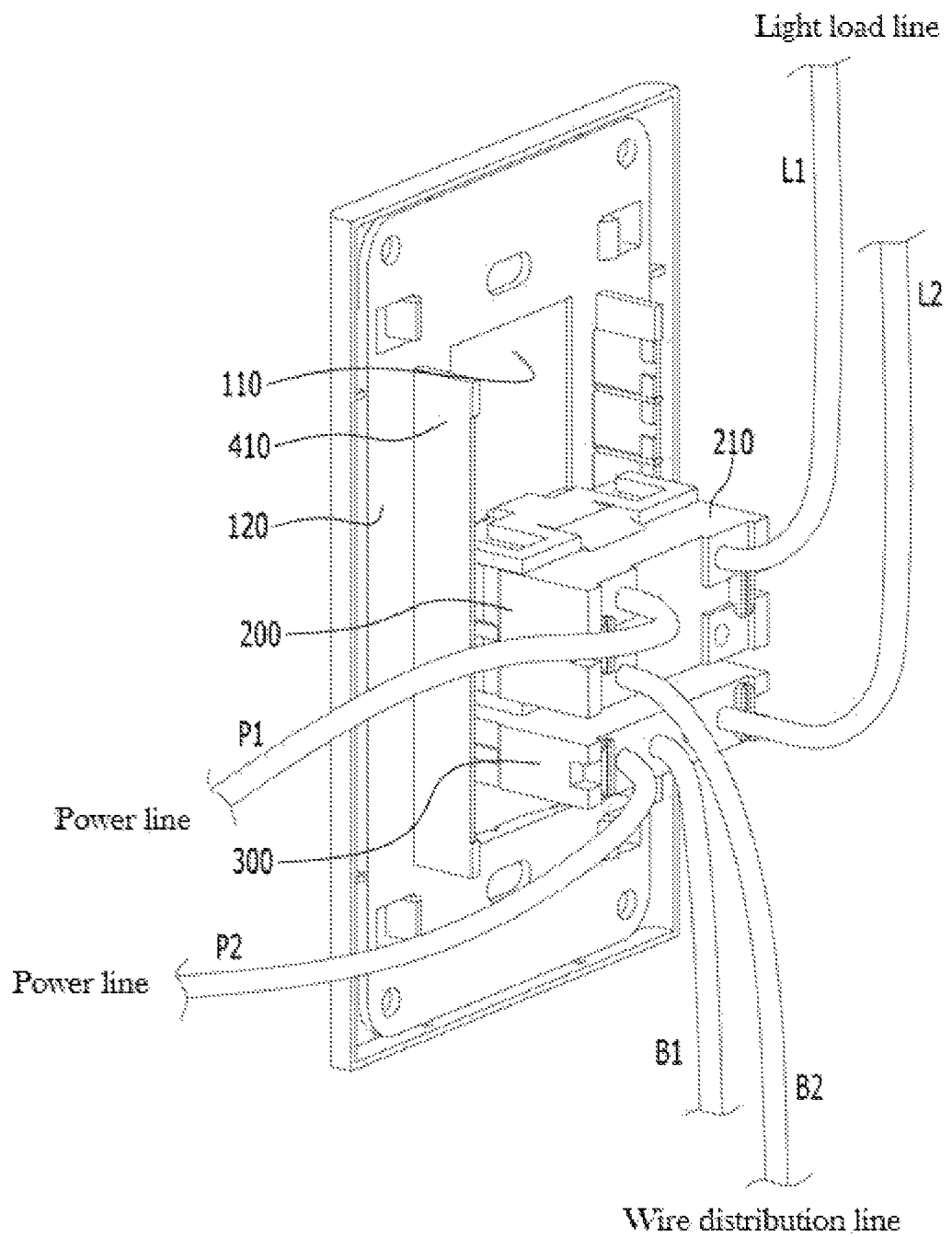
FIG. 12 is a view illustrating a wired state by the wire distributor-combined tumbler switch device according to the embodiment of the present disclosure.

FIG. 2 is a perspective view illustrating a wire distributor-combined tumbler switch device according to an embodiment of the present disclosure, as viewed from the front side, FIG. 3 is a perspective view illustrating the wire distributor-combined tumbler switch device according to the embodiment of the present disclosure, as viewed from the rear side, FIG. 4 is an exploded perspective view illustrating the wire distributor-combined tumbler switch device according to the embodiment of the present disclosure, as viewed from the rear side, and FIG. 5 is a side view illustrating the wire distributor-combined tumbler switch device according to the embodiment of the present disclosure. FIG. 6 is a perspective view illustrating a mounting bracket member constituting the wire distributor-combined tumbler switch device according to the embodiment of the present disclosure, as viewed from the rear side, FIG. 7 is a partially enlarged view illustrating the mounting bracket member constituting the wire distributor-combined tumbler switch device according to the embodiment of the present disclosure, and FIG. 8 is a perspective view illustrating a switching assembly constituting the wire distributor-combined tumbler switch device according to the embodiment of the present disclosure. FIG. 9 is a perspective view illustrating a wire distributor assembly constituting the wire distributor-combined tumbler switch device according to the embodiment of the present disclosure, FIG. 10 is an exploded perspective view illustrating a wire distributor assembly constituting the wire distributor-combined tumbler switch device according to the embodiment of the present disclosure, FIG. 11 is a cross-sectional view illustrating the wire distributor assembly constituting the wire distributor-combined tumbler switch device according to the embodiment of the present disclosure, and FIG. 12 is a view illustrating a wired state by the wire distributor-combined tumbler switch device according to the embodiment of the present disclosure.

As illustrated in FIGS. 2 to 12, the wire distributor-combined tumbler switch device according to the embodiment of the present disclosure generally includes: a bracket assembly 100; a switching assembly 200; a wire distributor assembly 300; and a detachable coupling means 400.

Specifically, as illustrated in FIGS. 2 to 12, the wire distributor-combined tumbler switch device include: a bracket assembly 100 fixed to a switch housing bracket installed on a wall surface of a building; a switching assembly 200 coupled to the bracket assembly 100 and configured to electrically connect electric wires of a distributing board and an electric wire of an electric device such as a light fixture to regulate power on/off; a wire distributor assembly 300 coupled to the bracket assembly 100 and configured to distribute electric wires of the distributing board so as to be connected to other electric devices; and a detachable coupling means 400 configured to detachably couple the switching assembly 200 and the wire distributor assembly 300 to the bracket assembly 100.

The bracket assembly 100 may include: a coupling bracket 110 coupled and mounted on a front surface of the housing mounted in a wall body and having an opening 111 through which a switching knob of the switching assembly 200 to be described below is exposed to the outside at the central portion thereof; and a closing cover 120 coupled to a front surface of the coupling bracket 110 and having an opening 121 through which the switching knob 220 of the switching assembly 200 is exposed to the outside at the central portion thereof.

The opening 111 of the coupling bracket 110 is formed to have a size in consideration of the size of the switching knob 220 of the switching assembly 200. In other words, if a single switching assembly 200 is provided to turn on/off a single light fixture, the opening 111 of the coupling bracket 110 is formed to cover the single switching knob 220 of the switching assembly 200 while exposing the same.

One component of the detachable coupling means 400 to be described in detail below is formed on the rear surface of the coupling bracket 110.

The switching assembly 200 is coupled to the coupling bracket 110 of the bracket assembly 100 to electrically regulate the power on/off of the power line from a distributing board and an electric wire of a light fixture or the like. Specifically, the switching assembly 200 may include an enclosure-type switch housing 210 having a plurality of connection hole 211—pairs, a fixed contact (not shown) provided in the switch housing 210 and to which an electric wire is connected, a movable contact (not shown) provided on an upper portion of the fixed contact to energize and short the fixed contact according to a see-saw motion thereof, and a switching knob 220 rotatably mounted on the movable contact (not shown) to see-saw the movable contact during rotation.

Here, the switch housing 210 is provided with one component of the detachable coupling means 400 to be described in detail below.

The switching assembly 200 may be composed of two or more assemblies depending on to the number of electrical appliances to be switched. This will be described below.

The wire distributor assembly 300 is coupled to the bracket assembly 100 to distribute the wires of the distributing board so that the wires are connected to one or more other electric devices. Here, other electric devices mean electric devices other than the electric device that is switched on/off by the switching assembly 200.

Specifically, as illustrated in FIGS. 10 and 11, the wire distributor assembly 300 may include an enclosure-type module housing 310 that is divided by one or more partition walls 311 to form a plurality of spaces therein, a plurality of wire entry hole 320—pairs formed on the upper surface of the module housing 310, an electrical connection plate 330 electrically connected to the electric wires introduced into the wire entry holes 320, and an elastic support 340 provided in the module housing 310 to elastically support the electric wire introduced into the wire entry hole 320 to be electrically connected to the electrical connection plate 330.

The module housing 310 may include an enclosure-type housing body 312 with one surface (lower surface) opened, and a cover plate 313 covering the opening of the housing body 312.

The module housing 310 is provided with one component of the detachable coupling means 400 to be described in detail below.

The pair of wire entry holes 320 are composed of a plurality of wire entry hole pairs, wherein the wire entry holes are formed on the upper surface of the module housing 310 at a predetermined interval in the longitudinal direction, which enables wiring to a plurality of other electric devices.

The electrical connection plate 330 may include: a plurality of connection plate parts 331 each formed along a downward extension line of each of the wire entry holes 320; and a common plate part 332 integrally formed with lower ends of the connection plate parts at the bottom of the module housing 310.

The elastic support 340 is generally formed in an inverted "S" shape in which a lower end thereof is fixed to the common plate part 332, and an upper end thereof extends obliquely so that the extended end is provided in elastic contact with the connection plate parts 331 of the electrical connection plate 330.

Accordingly, the electric wire introduced through the wire entry hole 320 is located between the connection plate part 331 of the electrical connection plate 330 and the elastic support 340 such that the wire is electrically connected to the connection plate part 331 while being elastically supported toward the connection plate part 331 by the upper end of the elastic support 340.

The wire distributor assembly 300 may further include a push operator 350 in which an upper portion thereof is partially exposed toward the upper surface of the module housing 300 so as not to fall off toward the upper surface of the module housing 300, and a lower portion thereof is in contact with the upper end of the elastic support 340 so that the upper end is pressed.

In case the push operator 350 is additionally configured as described above, when the upper end of the push operator 350 is pressed, the upper end of the elastic support 340 is pressed so that a gap is formed from the connection plate part 331 of the electrical connection plate 330, and in this state, the pressing operation is released after the electric wire is inserted into the electric wire entry hole 320. The reverse operation is performed in the reverse order.

By configuring the push operator 350 in this way, it is possible to more easily perform the connection and disconnection of the electric wire.

Here, when the wire distributor assembly 300 is coupled to the coupling bracket 110 of the bracket assembly 100, the wire distributor assembly is mounted in parallel with the switching assembly 200.

The detachable coupling means 400 is configured to detachably couple the switching assembly 200 and the wire distributor assembly 300 to the coupling bracket 110 of the bracket assembly 100. Specifically, in an embodiment, the detachable coupling means 400 may include: a pair of protruding flanges 410 formed on both sides of a rear surface of the coupling bracket 110; a pair of locking hooks 420 protruding from inner surfaces of the pair of protruding flanges 410; a pair of first locking steps 430 protruding from both sides of the switching housing 210 of the switching assembly 200 so as to be fixedly hooked by the locking hooks 420 when mounted between the pair of protruding flanges 410; and a pair of second locking steps 440 protruding from both sides of the module housing 310 of the wire distributor assembly 300 so as to be fixedly hooked by the locking hooks 420 when mounted between the pair of protruding flanges 410.

The protruding flanges 410 are formed on both sides of the opening 111 in the rear surface of the coupling bracket 410.

The locking hook 420 is formed in a triangular cross-sectional shape whose lower surface is the bottom.

Here, the detachable coupling means 400 may further include a guide fixing means 450 configured to guide the mounting operation of the switching housing 210 of the switching assembly 200 and the module housing 310 of the wire distributor assembly 300 and fix the switching housing and the module housing in a direction orthogonal to the mounting direction.

The guide fixing means 450 may include: a guide groove 451 formed in a central portion of the locking hook 420; and a guide protrusion 452 formed in a direction orthogonal to the first and second locking steps 430 and 440 so as to be guided along the guide groove 451 when mounted.

Here, the guide protrusion 452 is formed to have a length such that the guide protrusion 452 is in a state of being inserted into the guide groove 451 when the upper surfaces of the locking steps 430 and 440 are fixedly hooked by the lower surface of the locking hook 420.

In addition, the guide fixing means 450 may include a plurality of support protrusions 453 formed at a predetermined interval to protrude from the inner surfaces of the protruding flanges 410 in a direction perpendicular to the longitudinal direction of the protruding flange 410 so that both edges of the switching housing 210 of the switching assembly 200 and the module housing 310 of the wire distributor assembly 300 are contact-supported therebetween.

In another embodiment, the detachable coupling means 400 may include: a pair of guide rails respectively formed on both sides of the rear surface of the coupling bracket 110; a plurality of mounting grooves formed at regular intervals on a bottom surface of the guide rail; a plurality of seating grooves formed in a sidewall of the guide rail at a predetermined interval; a plurality of mounting protrusion formed to protrude from both sides of a lower surface of the switching housing 210 of the switching assembly 200 and the module housing 310 of the wire distributor assembly 300 so as to be fixedly inserted into the mounting grooves; and a plurality of seating protrusions formed to protrude from both sides of the switching housing 210 of the switching assembly 200 and the module housing 310 of the wire distributor assembly 300 so as to be seated and coupled to the seating grooves.

The seating groove and the seating protrusion are formed to be round, and it is preferable that the seating groove and the seating protrusion are respectively formed on the lower side of the surface at which the seating groove and the seating protrusion are formed.

In addition, in a detachable coupling means 400 according to another embodiment, a first concave-convex part is formed on the upper side of the seating groove in a direction orthogonal to the mounting direction, and a second concavo-convex part is formed on the upper side of the seating protrusion so as to continuously extend in a direction orthogonal to the mounting direction. In this case, the seating groove is formed on an extension line of a concave portion of the first concave-convex part, and the seating protrusion is formed in a concave portion of the second concave-convex part.

As such, the detachable coupling means 400 of the embodiment is firmly fixed in position without detachment in a direction orthogonal to the mounting direction by configuring the first concave-convex part and the second concave-convex part.

Referring to exemplary wire distribution in the wire distributor-combined tumbler switch device according to the embodiment of the present disclosure configured as described above, as illustrated in FIG. 12, power lines P1 and P2 from a distributing board in a building are connected through one wire connection hole 211 of the switching assembly 200 and through one wire entry hole 320 of the wire distributor assembly 300, and light load lines L1 and L2 of a light fixture to be controlled on/off are connected through another wire connection hole 211 of the switching assembly 200 and through another wire entry hole 320 of the wire distributor assembly 300. In addition, wire distribution lines B1 and B2 to be connected to other electric devices are also connected through yet another wire connection hole 211 of the switching assembly 200 and through yet another wire entry hole 320 of the wire distributor assembly 300, so that wire distribution can be implemented by the tumbler switch device.

Figure 13:
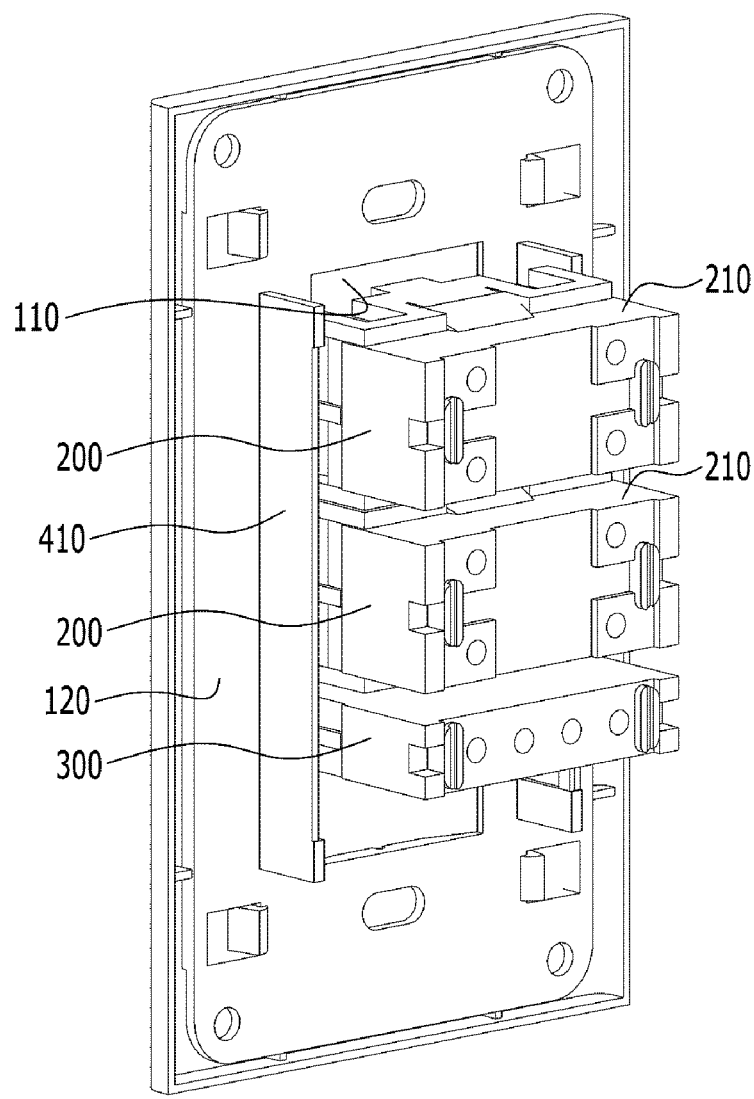
FIG. 13 is a perspective view illustrating a wire distributor-combined tumbler switch device configured as a two-unit tumbler switch device according to a second embodiment of the present disclosure.

On the other hand, FIG. 13 is a perspective view illustrating a wire distributor-combined tumbler switch device configured as a two-unit tumbler switch device according to a second embodiment of the present disclosure. In this embodiment, two switching assemblies 200 are mounted, and a wire distributor assembly 300 is mounted in parallel therewith on one side of the switching assemblies.

The wire distributor-combined tumbler switch device according to the present disclosure may adopt not only the two-unit tumbler switch device illustrated in FIG. 13, but also a tumbler switch device capable of on/off operation of two or more units.

Figure 14:
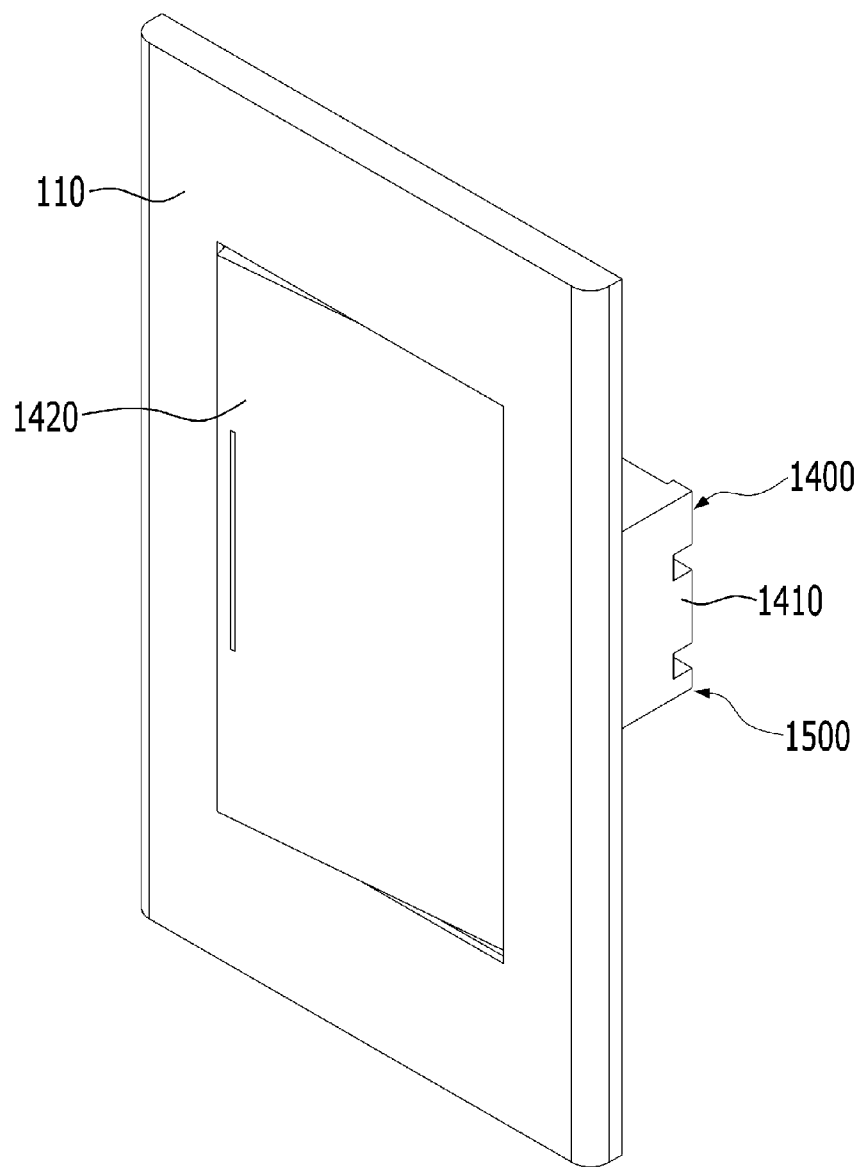
FIG. 14 is a perspective view illustrating a wire distributor-integrated tumbler switch device according to a third embodiment of the present disclosure as viewed from the front side.
Figure 15:
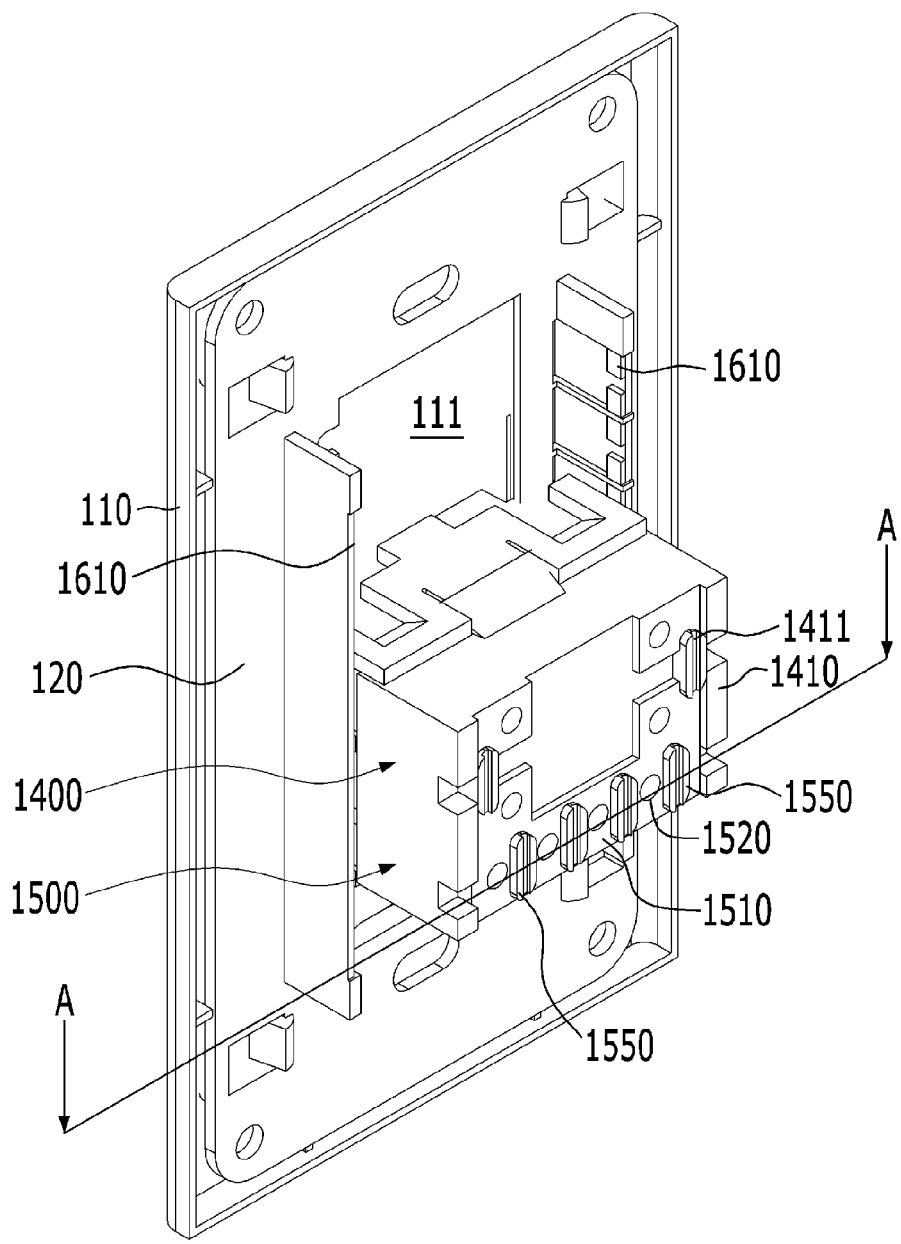
FIG. 15 is a perspective illustrating the wire distributor-integrated tumbler switch device according to the third embodiment of the present disclosure as viewed from the rear side.
Figure 16:
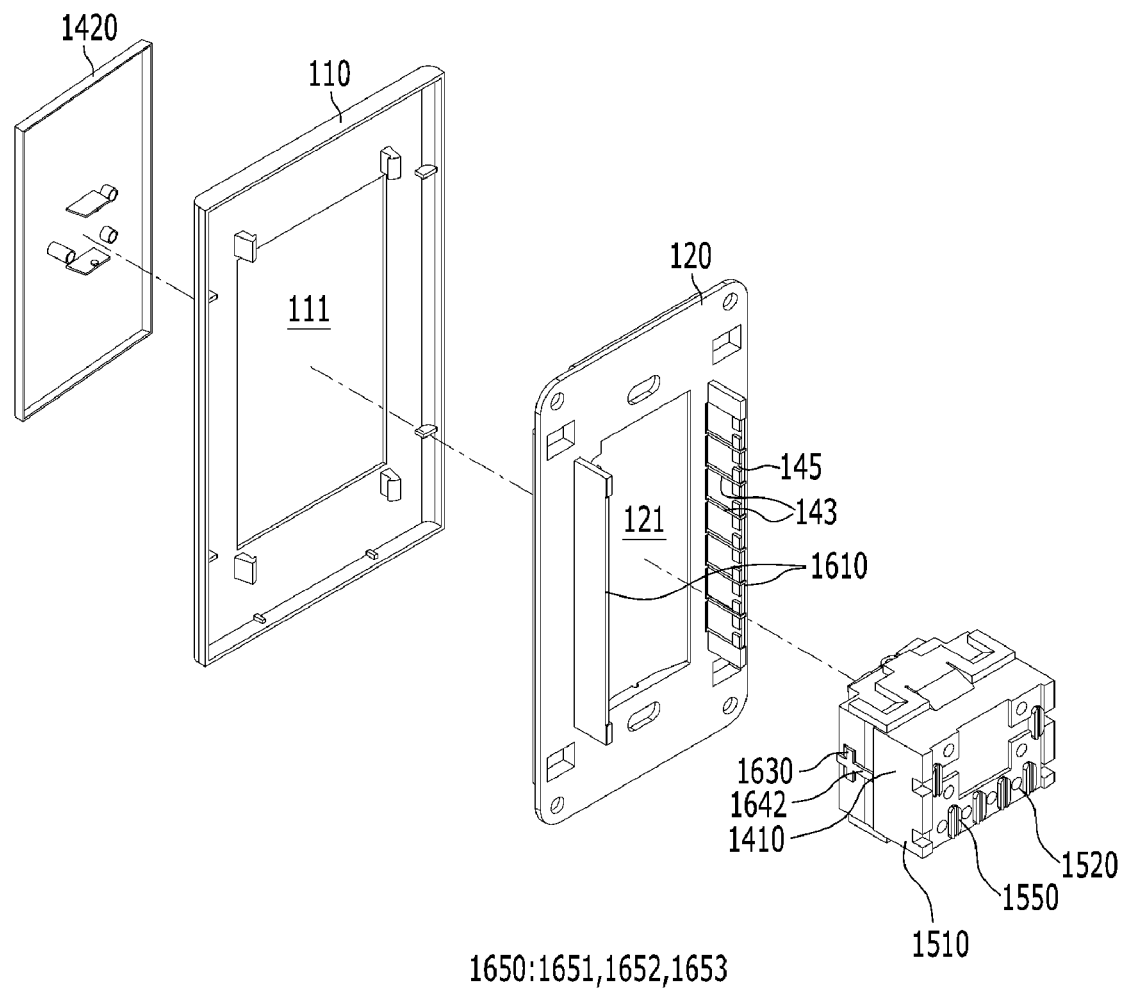
FIG. 16 is an exploded perspective view illustrating the wire distributor-integrated tumbler switch device according to the third embodiment of the present disclosure as viewed from the rear side.
Figure 17:
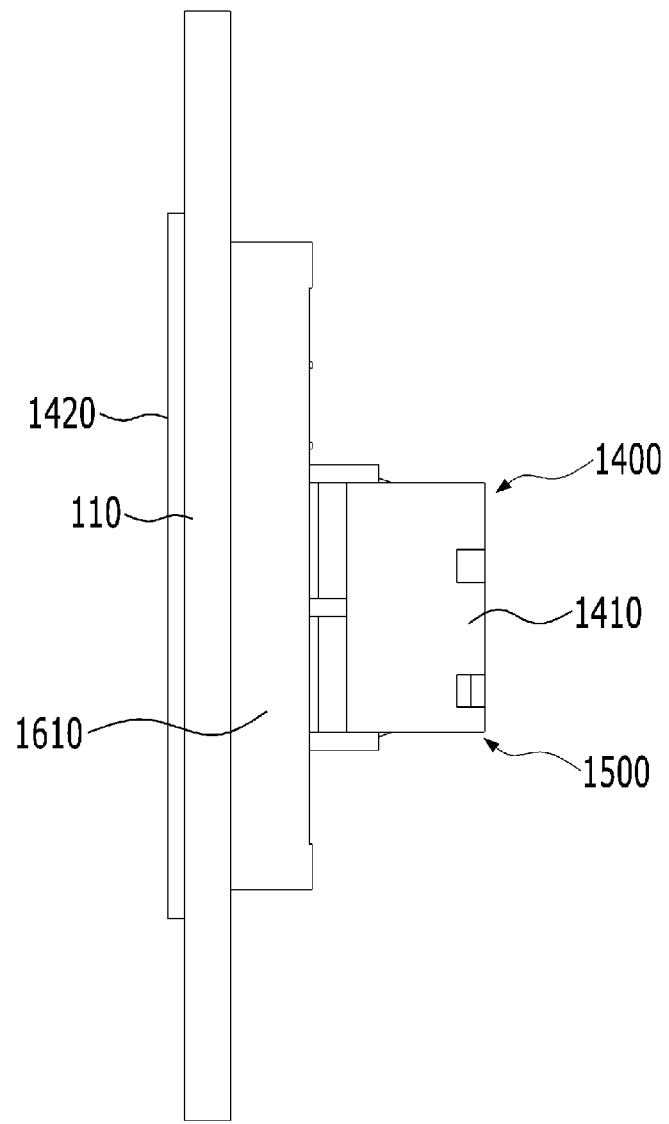
FIG. 17 is a side view illustrating the wire distributor-integrated tumbler switch device according to the third embodiment of the present disclosure as viewed from the rear side.
Figure 18:
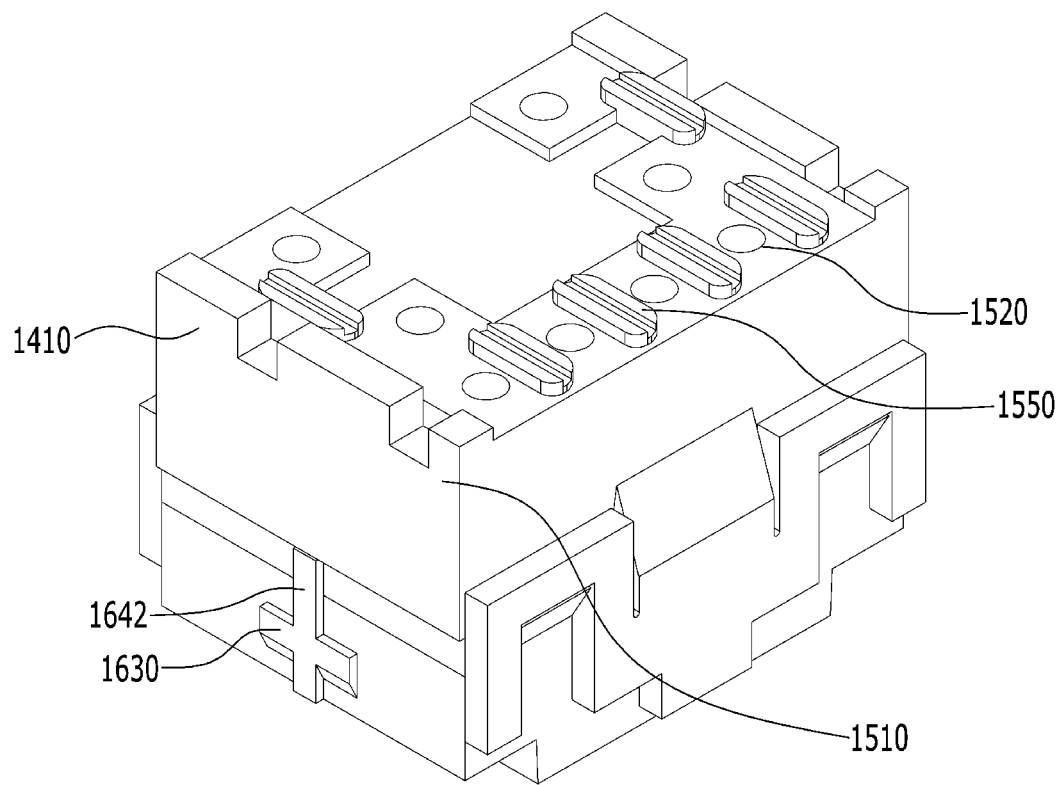
FIG. 18 is a perspective view illustrating a switching-wire distributor module constituting the wire distributor-integrated tumbler switch device according to the third embodiment of the present disclosure.
Figure 19:
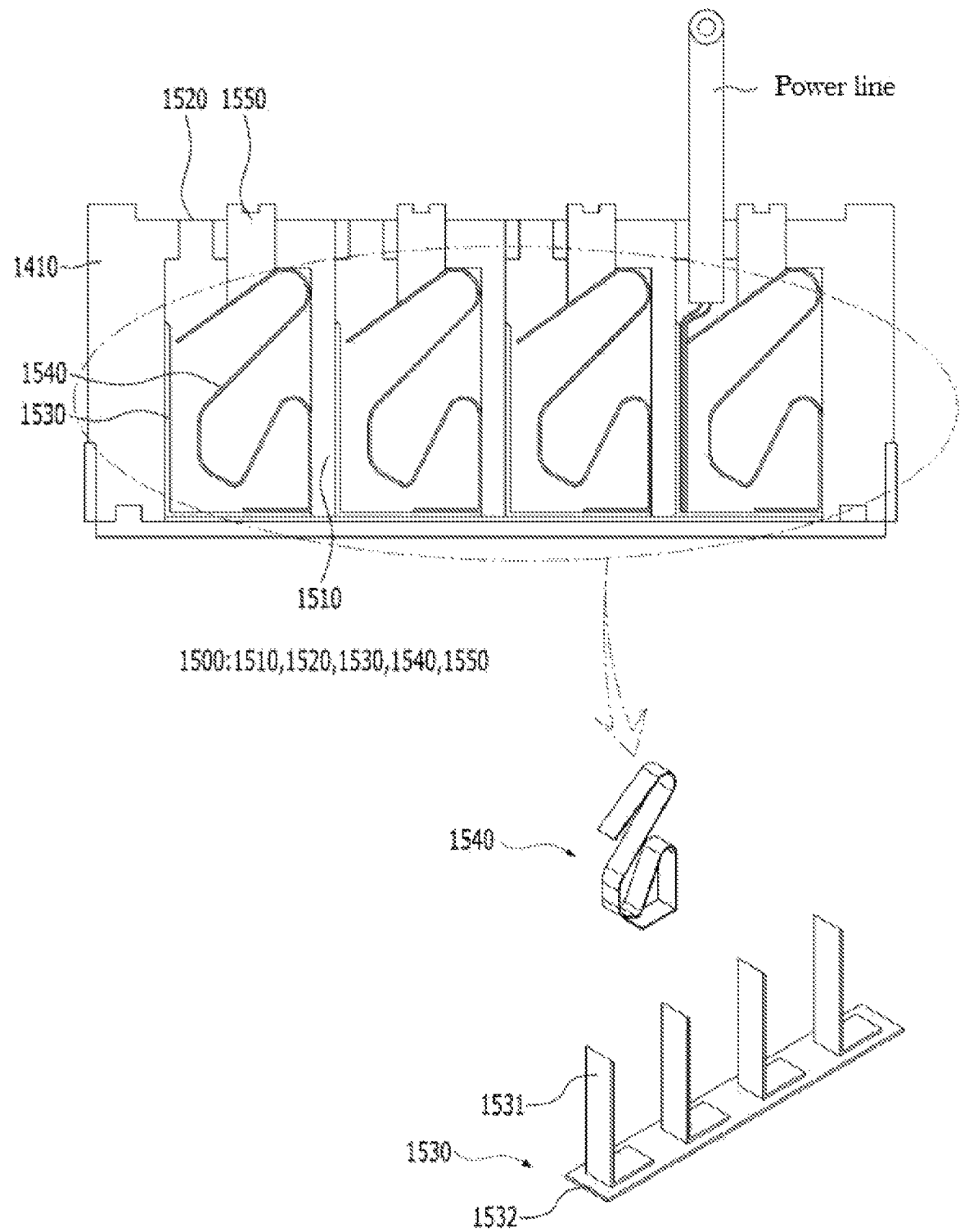
FIG. 19 is a cross-sectional view taken along line 'A'-'A' of FIG. 15.
Figure 20:
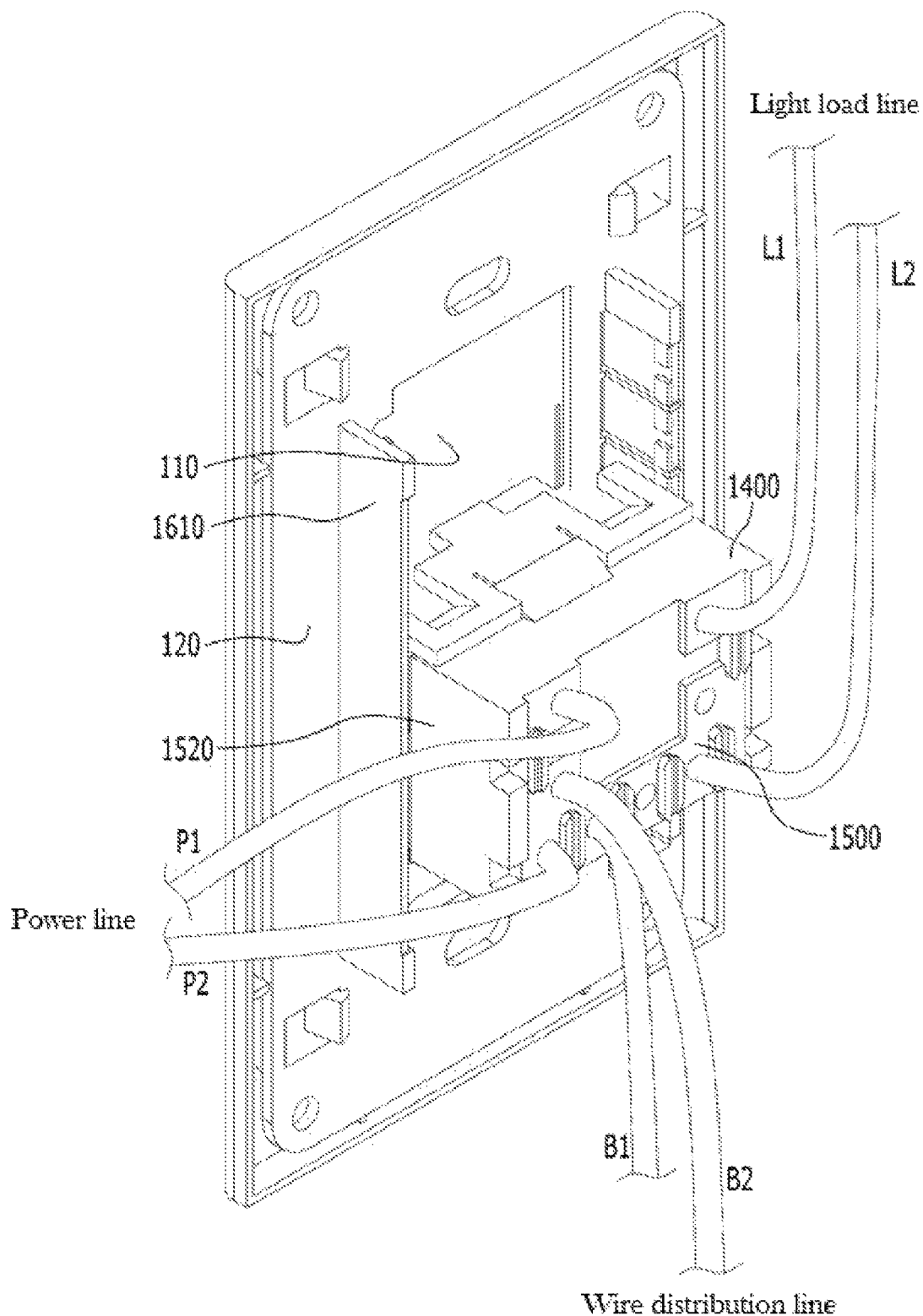
FIG. 20 is a view illustrating a wired state by the wire distributor-integrated tumbler switch device according to the third embodiment of the present disclosure.
Figure 21:
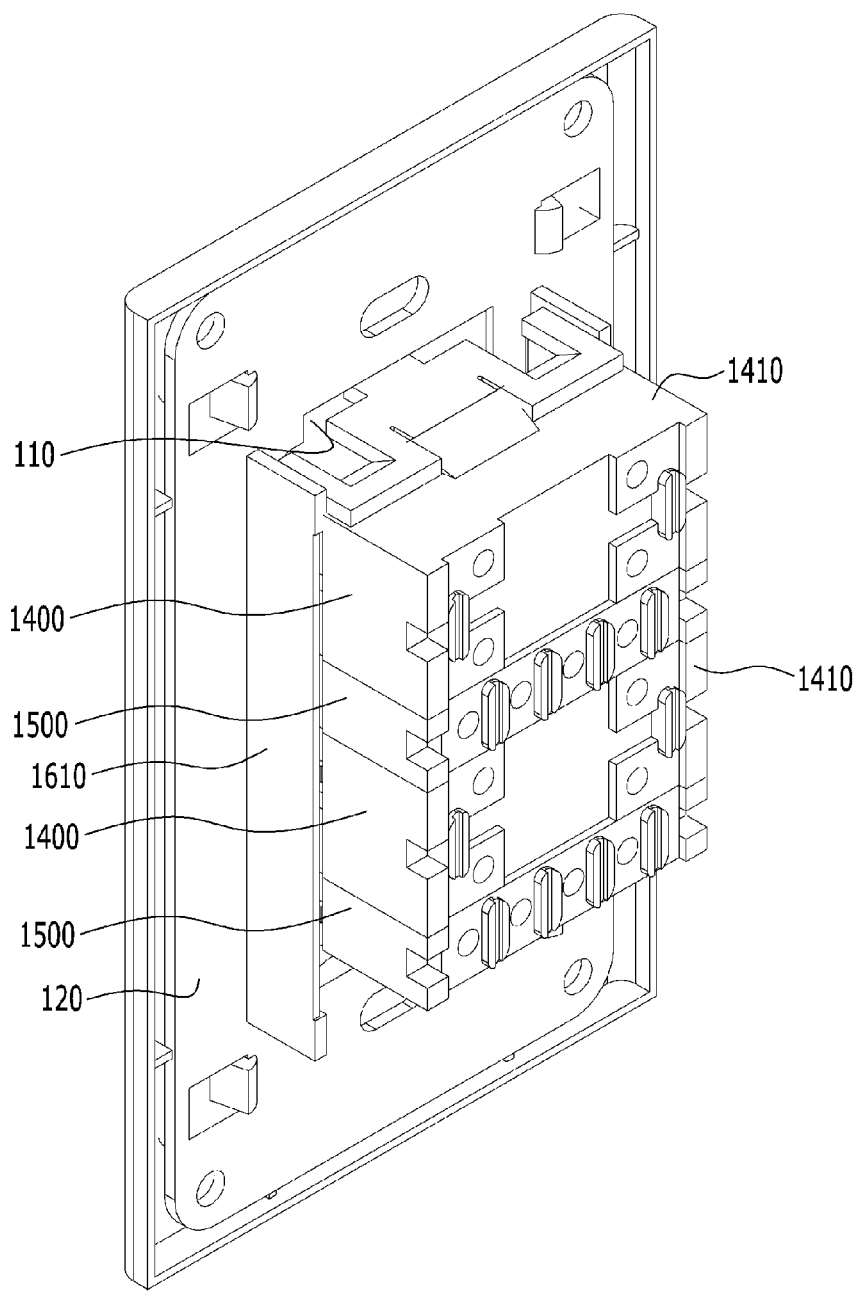
FIG. 21 is a view illustrating a modified example of a wire distributor-integrated tumbler switch device according to a fourth embodiment of the present disclosure.

FIG. 14 is a perspective view illustrating a wire distributor-integrated tumbler switch device according to a third embodiment of the present disclosure as viewed from the front side, FIG. 15 is a perspective view illustrating the wire distributor-integrated tumbler switch device according to the third embodiment of the present disclosure as viewed from the rear side, FIG. 16 is an exploded perspective view illustrating the wire distributor-integrated tumbler switch device according to the third embodiment of the present disclosure as viewed from the rear side, FIG. 17 is a side view illustrating the wire distributor-integrated tumbler switch device according to the third embodiment of the present disclosure as viewed from the rear side, FIG. 18 is a perspective view illustrating a switching-wire distributor module constituting the wire distributor-integrated tumbler switch device according to the third embodiment of the present disclosure, FIG. 19 is a cross-sectional view taken along line 'A'-'A' of FIG. 15, FIG. 20 is a view illustrating a wired state by the wire distributor-integrated tumbler switch device according to the third embodiment of the present disclosure, and FIG. 21 is a view illustrating a modified example of a wire distributor-integrated tumbler switch device according to a fourth embodiment of the present disclosure.

As illustrated in FIGS. 14 to 20, the wire distributor-integrated tumbler switch device according to the third embodiment of the present disclosure generally includes: a bracket assembly 100; a switching-wire distributor module 1400, 1500; and a detachable coupling means 1600.

Specifically, as illustrated in FIGS. 14 to 20, the wire distributor-integrated tumbler switch device according to the third embodiment includes: a bracket assembly 100 fixed to a switch housing bracket installed on a wall surface of a building; a switching-wire distributor module 1400, 1500 coupled to the bracket assembly 100 and configured to electrically connect electric wires of a distributing board and an electric wire of an electric device such as a light fixture to regulate power on/off, and to distribute the electric wires of the distributing board so as to be connected to other electric devices; and a detachable coupling means 1600 configured to detachably couple the switching-wire distributor module 1400, 1500 to the bracket assembly 100.

The bracket assembly 100 may include: a coupling bracket 110 coupled and mounted on a front surface of the housing mounted in a wall body and having an opening 111 through which a switching knob of the switching assembly 1400 to be described below is exposed to the outside at the central portion thereof; and a closing cover 120 coupled to a front surface of the coupling bracket 110 and having an opening 121 through which the switching knob 1420 of the switching assembly 1400 is exposed to the outside at the central portion thereof.

The opening 111 of the coupling bracket 110 is formed to have a size in consideration of the size of the switching knob 1420 of the switching assembly 1400. In other words, if a single switching assembly 1400 is provided to turn on/off a single light fixture, the opening 111 of the coupling bracket 110 is formed to cover the single switching knob 1420 of the switching assembly 1400 while exposing the same.

One component of the detachable coupling means 1600 to be described in detail below is formed on the rear surface of the coupling bracket 110.

Further, the wire distributor module 1400, 1500 includes: a module housing 1410; a switching assembly 1400 provided on one side of the module housing 1410 and configured to electrically connect electric wires of a distributing board and an electric wire of an electric device such as a light fixture to regulate power on/off; a wire distributor assembly 1500 provided on the other side of the module housing 1410 and configured to distribute electric wires of the distributing board so as to be connected to other electric devices; and a partition wall (not shown) (first partition wall) configured to divide the switching assembly 1400 and the wire distributor assembly 1500.

The switching assembly 1400 may employ a configuration such as a conventional switching assembly that is coupled to the coupling bracket 110 of the bracket assembly 100 to electrically regulate the power on/off of the power line from a distributing board and an electric wire of a light fixture or the like.

For example, the switching assembly 1400 may include a fixed contact (not shown) provided on one side of the partition wall in the module housing 1410 and to which an electric wire is connected, a movable contact (not shown) provided on an upper portion of the fixed contact to energize and short the fixed contact according to a see-saw motion thereof, and a switching knob 1420 rotatably mounted on the movable contact (not shown) to see-saw the movable contact during rotation.

The module housing 1410 may be provided with one component of the detachable coupling means 1600 to be described in detail below.

The switching assembly 1400 may be composed of two or more assemblies depending on to the number of electrical appliances to be switched.

Further, the wire distributor assembly 1500 is provided on the other side of partition wall in the module housing 1410 to distribute the wires of the distributing board so that the wires are connected to one or more other electric devices.

Here, other electric devices mean electric devices other than the electric device that is switched on/off by the switching assembly 1400.

Specifically, the wire distributor assembly 1500 may include a partition wall (second partition wall 1510) dividing a spacer divided by a partition wall member on the other side of the module housing 1410 into a plurality of sub-spaces, a plurality of wire entry holes 1520 formed on the upper surfaces of the sub-spaces divided by the partition wall 1510, an electrical connection plate 1530 electrically connected to the electric wires introduced into the wire entry holes 1520, and an elastic support 1540 provided in the module housing 1410 in the sub-space divided by the partition wall to elastically support the electric wire introduced into the wire entry hole 1520 to be electrically connected to the electrical connection plate 1530.

The wire entry holes 320 are formed on the upper surface of the module housing 310 at a predetermined interval in the longitudinal direction, which enables wiring to a plurality of other electric devices.

Further, the electrical connection plate 1530 may include: a plurality of connection plate parts 1531 each formed along a downward extension line of each of the wire entry holes 1520; and a common plate part 1532 integrally formed with lower ends of the connection plate parts 1531 at the bottom of the module housing 1410.

The elastic support 1540 is generally formed in an inverted "S" shape in which a lower end thereof is fixed to the common plate part 1532, and an upper end thereof extends obliquely so that the extended end is provided in elastic contact with the connection plate parts 1531 of the electrical connection plate 1530.

Accordingly, the electric wire introduced through the wire entry hole 1520 is located between the connection plate part 1531 of the electrical connection plate 1530 and the elastic support 1540 such that the wire is electrically connected to the connection plate part 1531 while being elastically supported toward the connection plate part 1531 by the upper end of the elastic support 1540.

The wire distributor assembly 1500 may further include a push operator 1550 in which an upper portion thereof is partially exposed toward the upper surface of the module housing 1410 so as not to fall off toward the upper surface of the module housing 1410, and a lower portion thereof is in contact with the upper end of the elastic support 1540 so that the upper end is pressed.

In case the push operator 1550 is additionally configured as described above, when the upper end of the push operator 1550 is pressed, the upper end of the elastic support 1540 is pressed so that a gap is formed from the connection plate part 1531 of the electrical connection plate 1530, and in this state, the pressing operation is released after the electric wire is inserted into the electric wire entry hole 1520. The reverse operation is performed in the reverse order.

By configuring the push operator 1550 in this way, it is possible to more easily perform the connection and disconnection of the electric wire.

The detachable coupling means 1600 is configured to detachably couple the switching-wire distributor module 1400, 1500 to the coupling bracket 110 of the bracket assembly 100.

Specifically, in an embodiment, the detachable coupling means 1600 may include: a pair of protruding flanges 1610 formed on both sides of a rear surface of the coupling bracket 110; a pair of locking hooks 1620 protruding from inner surfaces of the pair of protruding flanges 1610; and a pair of locking steps 1630 protruding from both sides of the module housing 1410 so as to be fixedly hooked by the locking hooks 1620 when mounted between the pair of protruding flanges 1610.

The protruding flanges 1610 are formed on both sides of the opening 111 in the rear surface of the coupling bracket 110.

The locking hook 1620 is formed in a triangular cross-sectional shape whose lower surface is the bottom.

Here, the detachable coupling means 1600 may further include a guide fixing means 1640 configured to guide the mounting operation of the module housing 1410 and fix the switching housing and the module housing in a direction orthogonal to the mounting direction.

The guide fixing means 1640 may include: a guide groove 1641 formed in a central portion of the locking hook 1620; and a guide protrusion 1642 formed in a direction orthogonal to the locking step 1630 so as to be guided along the guide groove 1641 when mounted.

Here, the guide protrusion 1642 is formed to have a length such that the guide protrusion 1642 is in a state of being inserted into the guide groove 1641 when the upper surface of the locking step 1630 is fixedly hooked by the lower surface of the locking hook 1620.

In addition, the guide fixing means 1640 may include a plurality of support protrusions 1643 formed at a predetermined interval to protrude from the inner surfaces of the protruding flanges 1610 in a direction perpendicular to the longitudinal direction of the protruding flange 1610 so that both edges of the module housing 1410 are contact-supported therebetween.

Next, in another embodiment, the detachable coupling means 1600 may include: a pair of guide rails respectively formed on both sides of the rear surface of the coupling bracket 110; a plurality of mounting grooves formed at regular intervals on a bottom surface of the guide rail; a plurality of seating grooves formed in a sidewall of the guide rail at a predetermined interval; a plurality of mounting protrusion formed to protrude from both sides of a lower surface of the module housing 1410 so as to be fixedly inserted into the mounting grooves; and a plurality of seating protrusions formed to protrude from both sides of the module housing 1410 so as to be seated and coupled to the seating grooves.

The seating groove and the seating protrusion are formed to be round, and it is preferable that the seating groove and the seating protrusion are respectively formed on the lower side of the surface at which the seating groove and the seating protrusion are formed.

In addition, in a detachable coupling means 1600 according to another embodiment, a first concave-convex part is formed on the upper side of the seating groove in a direction orthogonal to the mounting direction, and a second concavo-convex part is formed on the upper side of the seating protrusion so as to continuously extend in a direction orthogonal to the mounting direction. In this case, the seating groove is formed on an extension line of a concave portion of the first concave-convex part, and the seating protrusion is formed in a concave portion of the second concave-convex part.

As such, the detachable coupling means 1600 of the embodiment is firmly fixed in position without detachment in a direction orthogonal to the mounting direction by configuring the first concave-convex part and the second concave-convex part.

Referring to exemplary wire distribution in the wire distributor-integrated tumbler switch device according to the present disclosure configured as described above, as illustrated in FIG. 20, power lines P1 and P2 from a distributing board in a building are connected through one wire connection hole 1411 of the switching assembly 1400 and through one wire entry hole 1520 of the wire distributor assembly 1500, and light load lines L1 and L2 of a light fixture to be controlled on/off are connected through another wire connection hole 1411 of the switching assembly 1400 and through another wire entry hole 1520 of the wire distributor assembly 1500. In addition, wire distribution lines B1 and B2 to be connected to other electric devices are also connected through yet another wire connection hole 1411 of the switching assembly 1400 and through yet another wire entry hole 1520 of the wire distributor assembly 1500, so that wire distribution can be implemented by the tumbler switch device.

Meanwhile, FIG. 21 is a view illustrating a modified example of a wire distributor-integrated tumbler switch device according to a fourth embodiment of the present disclosure. The tumbler switch device may employ a tumbler switch device with two units, and a tumbler switch device capable of on/off operation of more than two units.

In addition, according to the present disclosure, the wire distributor assemblies 1500 constituting the switching-wire distributor module 1400, 1500 may be formed on both sides of the switching assembly 1400, respectively. In other words, the module housing 1410 is divided by two partition wall members, the switching assembly 1400 is configured at the central portion thereof, and the wire distributor assemblies 1500 are configured on both sides divided by the partition wall member.

When the wire distributor assemblies are configured as described above, one wire distributor assembly may be used for a neutral wiring, and the other wire distributor assembly may be used for a ground wiring.

The wire distributor-integrated tumbler switch device according to the present disclosure as described before has the effects of improving the work efficiency by enabling the electrical entry and distributing connection work at a certain height of the vertical wall of a building, of improving the worker's mobility and work environment by simplifying the necessary equipment used for the electrical wiring work, and of preventing safety accidents such as falls because electrical wiring work in the ceiling of a building is not required.

Further, the present disclosure has the effects of improving the convenience of electrical wiring construction and saving the electrical wiring material by arranging the power lines drawn out from the distribution box along the indoor floor for each division and along the indoor sidewall.

The invention claimed is:

1. A wire distributor-integrated tumbler switch device comprising:
   bracket assembly fixed to a switch housing bracket installed on a wall surface of a building;
   a switching-wire distributor module coupled to the bracket assembly and configured to allow an electric wire of an electric device to be electrically connected thereto, to regulate power on/off, and to distribute electric wires of a distributing board; and
   a detachable coupling means configured to detachably couple the switching-wire distributor module to the bracket assembly,
   wherein the bracket assembly comprises:
   a coupling bracket having an opening through which a switching knob is exposed; and a closing cover coupled to a front surface of the coupling bracket and having an opening through which the switching knob is exposed, and the switching-wire distributor module comprises: a module housing coupled to the bracket assembly; a first partition wall dividing the module housing into a plurality of division spaces; one or more switching assemblies provided in a space on one side of the module housing divided by the first partition wall such that an electric wire of an electric device is electrically connected thereto to control power on/off; and one or more wire distributor assembly provided in a space on the other side of the module housing divided by the first partition wall to distribute electric wires of a distributing board.

2. The wire distributor-integrated tumbler switch device according to claim 1, wherein the switching assembly comprises:
a wire connection hole formed in an upper surface of the module housing,
wherein the wire distributor assembly comprises: a second partition wall dividing the space divided by the first partition wall into a plurality of sub-spaces; a plurality of wire entry holes formed on the upper surface of the module housing in the sub-space divided by the second partition wall; an electrical connection plate electrically connected to the electric wire introduced into the wire entry hole; and an elastic support provided in the module housing to elastically support the electric wire introduced into the wire entry hole toward the electrical connection plate.

3. The wire distributor-integrated tumbler switch device according to claim 2, wherein the electrical connection plate comprises: a plurality of connection plate parts formed along downward extension lines of the wire entry holes; and a common plate part integrally formed at lower ends of the connection plate parts,
wherein the elastic support is formed in an inverted "S" shape in which a lower end thereof is fixed to the common plate part, and an upper end thereof extends obliquely so that the extended end is provided in elastic contact with the connection plate part of the electrical connection plate to allow the introduced wire to come into elastic contact toward the electrical connection plate,
wherein the wire distributor assembly further comprises a push operator in which an upper portion thereof is partially exposed toward the upper surface of the module housing so as not to fall off toward the upper surface of the module housing, and a lower portion thereof is in contact with the upper end of the elastic support so that the upper end is pressed.

4. The wire distributor-integrated tumbler switch device according to claim 2, wherein the detachable coupling means comprises:
a pair of protruding flanges formed on both sides of a rear surface of the coupling bracket;
a plurality of locking hooks protruding from opposite surfaces of the pair of protruding flanges; and
a pair of locking steps protruding from both sides of the module housing to be fixedly hooked by the locking hooks.

5. The wire distributor-integrated tumbler switch device according to claim 4, wherein the detachable coupling means further comprises a guide fixing means configured to guide the mounting operation of the module housing and fix the module housing in a direction orthogonal to the mounting direction.

6. The wire distributor-integrated tumbler switch device according to claim 5, wherein the guide fixing means comprises: a guide groove formed in a central portion of the locking hook; and a guide protrusion formed in a direction orthogonal to the locking step at a central portion of the locking step so as to be guided along the guide groove when mounted,
wherein the guide protrusion is formed to have a length such that the guide protrusion is in a state of being inserted into the guide groove when the locking step is fixedly hooked by the locking hook.

7. The wire distributor-integrated tumbler switch device according to claim 2, wherein the detachable coupling means comprises:
a pair of guide rails respectively formed on both sides of the rear surface of the coupling bracket;
a plurality of mounting grooves formed at regular intervals on a bottom surface of the guide rail;
a plurality of seating grooves formed in a sidewall of the guide rail at a predetermined interval;
a plurality of mounting protrusions formed to protrude from both sides of a lower surface of the module housing so as to be fixedly inserted into the mounting grooves; and
a plurality of seating protrusions formed to protrude from both sides of the module housing so as to be seated and coupled to the seating grooves.

8. A wire distributor-combined tumbler switch device comprising:
a bracket assembly fixed to a switch housing bracket installed on a wall surface of a building;
at least one switching assembly coupled to the bracket assembly and configured to allow an electric wire of an electric device to be electrically connected thereto and regulate power on/off;
at least one wire distributor assembly coupled to the bracket assembly and configured to distribute electric wires of a distributing board; and
a detachable coupling means configured to detachably couple the switching assembly and the wire distributor assembly to the bracket assembly,
wherein the bracket assembly comprises: a coupling bracket having an opening through which a switching knob is exposed; and a closing cover coupled to a front surface of the coupling bracket and having an opening through which the switching knob is exposed,
wherein the switching assembly comprises: an enclosure-type switch housing having a plurality of wire connection hole pairs, and
wherein the wire distributor assembly comprises: an enclosure-type module housing having a plurality of division spaces divided by one or more partition walls; a plurality of wire entry hole pairs formed on the upper surface of the module housing; an electrical connection plate electrically connected to the electric wire introduced into the wire entry hole; and an elastic support provided in the module housing to elastically support the electric wire introduced into the wire entry hole toward the electrical connection plate.

9. The wire distributor-combined tumbler switch device according to claim 8, wherein the electrical connection plate comprises: a plurality of connection plate parts respectively formed along downward extension lines of the wire entry holes; and a common plate part integrally formed at lower ends of the connection plate parts,
wherein the elastic support is formed in an inverted "S" shape in which a lower end thereof is fixed to the common plate part, and an upper end thereof extends obliquely so that the extended end is provided in elastic contact with the connection plate part of the electrical connection plate to allow the introduced wire to come into elastic contact toward the electrical connection plate, wherein the wire distributor assembly further comprises a push operator in which an upper portion thereof is partially exposed toward the upper surface of the module housing so as not to fall off toward the upper surface of the module housing, and a lower portion thereof is in contact with the upper end of the elastic support so that the upper end is pressed.

10. The wire distributor-combined tumbler switch device according to claim 8, wherein the detachable coupling means comprises:
- a pair of protruding flanges formed on both sides of a rear surface of the coupling bracket;
- a plurality of locking hooks protruding from opposite surfaces of the pair of protruding flanges;
- a pair of first locking steps protruding from both sides of the switch housing to be fixedly hooked by the locking hooks; and
- a pair of second locking steps protruding from both sides of the module housing to be fixedly hooked by the locking hooks.

11. The wire distributor-combined tumbler switch device according to claim 10, wherein the detachable coupling means further comprises a guide fixing means configured to guide the mounting operation of the switch housing and the module housing and fix the switch housing and the module housing in a direction orthogonal to the mounting direction.

12. The wire distributor-combined tumbler switch device according to claim 8, wherein the detachable coupling means comprises:
- a pair of guide rails respectively formed on both sides of the rear surface of the coupling bracket;
- a plurality of mounting grooves formed at regular intervals on a bottom surface of the guide rail;
- a plurality of seating grooves formed in a sidewall of the guide rail at a predetermined interval;
- a plurality of mounting protrusions formed to protrude from both sides of a lower surface of the switch housing and a lower surface of the module housing so as to be fixedly inserted into the mounting grooves; and
- a plurality of seating protrusions formed to protrude from both sides of the switch housing and the module housing so as to be seated and coupled to the seating grooves.

\* \* \* \* \*